3,303,225
PRODUCTION OF POLYMETALLATED
1-ACETYLENES
Henry L. Hsieh and John A. Favre, Bartlesville, Okla., assignors to Phillips Petroleum Company, a corporation of Delaware
No Drawing. Filed Dec. 26, 1962, Ser. No. 247,326
4 Claims. (Cl. 260—665)

This invention relates, broadly, to metalated acetylenes. In another aspect, this invention relates to a novel process for the preparation of metalated 1-acetylenes having up to and including 4 alkali metal substituents per molecule. In accordance with a further aspect, this invention relates to the use of novel metalated 1-acetylenes as polymerization initiators or catalysts.

There has been considerable interest in recent years in methods for the preparation of alkali metal acetylides. However, no simple method is known for preparing the alkali metal acetylides containing more than one alkali metal atom per molecule. We have discovered that polymetalated acetylenes can be prepared by reacting an organoalkali metal compound with an acetylene under certain conditions and that the reaction can be controlled to effect step-wise replacement of, first, the acetylenic hydrogen atom and, second, the hydrogen atoms attached to the carbon atom alpha to the acetylenic linkage. It has been further discovered that these reaction products can be quantitatively deuterated by reaction with deuterium oxide or can be used for other reactions involving the replacement of the alkali metal atoms with other monovalent organic radicals. It has been further found that metalated 1-acetylenes of the invention are active as polymerization initiators for vinylidene-containing monomers.

Accordingly, an object of this invention is to provide novel polymetalated acetylenes.

Another object of this invention is to provide a novel process for the preparation of metalated 1-acetylenes.

Another object of this invention is to provide novel polymerization initiators or catalysts comprising metalated acetylenes.

A further object of this invention is to provide a novel process for the polymerization of vinylidene-containing monomers utilizing the novel metalated acetylenes of the invention as initiators.

Broadly, according to the invention, novel acetylene compounds are provided having the formula

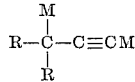

wherein each R is selected from hydrogen, M, and monovalent hydrocarbon radicals including saturated aliphatic, saturated cycloaliphatic and aromatic radicals generally having up to and including 12 carbon atoms, and M is an alkali metal.

Representative examples of some substituted 1-acetylene compounds contemplated within the above described formula include 1,3-dilithiopropyne,
1,3,3-trilithiopropyne,
1,3,3,3-tetralithiopropyne,
1,3,3-trilithiobutyne-1,
1,3-dilithobutyne-1,
1,3-disodiopropyne,
1,3,3-trisodiopropyne,
1,3,3,3-tetrasodiopropyne,
1,3-dipotassio-3-methylbutyne-1,
1,3-dilithio-3-methylpentyne-1,
1,3-dirubidio-3-ethylpentyne-1,
1,3-dicesio-3-propyl-6-methylheptyne-1,
1,3-dipotassio-3-nonyldodecyne-1,
1,3-difrancio-3-dodecylpentadecyne-1,
1,3,3-trisodiopentadecyne-1,
1,3-dilithio-3-cyclopentylpropyne,
1,3,3-tripotassio-3-cyclopentylpropyne,
1,3-disodio-3,3-dicyclohexylpropyne,
1,3-disodio-3-cyclopentylpropyne,
1,3-dilithio-3,3-diphenylpropyne,
1,3-dilithio-3-(2-naphthyl)propyne,
1,3,3-trirubidio-3-(2-naphthyl)propyne,
1,3-dilithio-3-(benzyl)-4-phenylbutyne-1,
1,3-dilithio-3-cyclohexylbutyne-1,
1,3,3-tricesio-4-cyclohexylbutyne-1,
1,3-dilithio-3-(3-methylcyclopentyl)butyne-1,
1,3,3-trifrancio-3-(4-methylcyclopentyl)propyne,
1,3-dilithio-3,3-bis(p-tolyl)propyne,
1,3-disodio-3-(4-methylnaphthyl)propyne,
1,3-dilithio-3-(4-cyclohexylphenyl)butyne-1,
1,3,3-tripotassio-3-(4-cyclohexylphenyl)propyne,
1,3-dirubidio-3-(4-phenylcyclohexyl)propyne,
1,3,3-trifrancio-3-(3-phenylcyclohexyl)propyne,
and the like.

Also, according to the invention, a novel process is provided for the preparation of alkali metal substituted acetylenes which process comprises contacting (a) an organoalkali metal compound of the formula $RM_x$, wherein R is a hydrocarbon radical selected from the group consisting of saturated aliphatic, saturated cycloaliphatic and aromatic radicals generally containing up to and including 20 carbon atoms, M is an alkali metal including specifically lithium, sodium, potassium, rubidium, cesium and francium, and $x$ is an integer from 1 to 4, inclusive, with (b) a 1-acetylene compound of the formula $R'C \equiv CH$, wherein R' is selected from hydrogen and $R''_2CH$— radicals, wherein each R" is selected from hydrogen and monovalent hydrocarbon radicals selected from saturated aliphatic, saturated cycloaliphatic and aromatic radicals generally containing up to and including 12 carbon atoms, said contacting being effected in an inert liquid reaction medium at a temperature ranging from —75 to 150° C. under sufficient pressure to maintain liquid phase conditions and employing a mol ratio of (a) to (b) ranging from 2:1 to 10:1.

In the above formula, the R group has a valence equal to the integer $x$ and preferably contains from 1 to 20, inclusive, carbon atoms, although it is within the scope of the invention to use higher molecular weight compounds.

Representative examples of alkali metal hydrocarbon compounds of the formula $RM_x$ that can be employed according to the present invention include methylsodium,
isopropylpotassium,
n-butyllithium,
tert-butylpotassium,
n-amylrubidium,
tert-octylcesium,
n-decyllithium,
nonylsodium,
cyclohexyllithium,
methylcyclohexylcesium,
phenylsodium,
naphthylpotassium,
phenyllithium,
4-butylphenylrubidium,
phenylfrancium,
p-tolylsodium,
4-phenylbutylsodium,
2,4-diethylphenyllithium,
benzylsodium,
4-cyclohexylphenyllithium, 3-phenylcyclohexylpotassium,
dilithiomethane,
1,4-disodiobutane,
1,10-dipotassiodecane,
1,20-dirubidioeicosane,
1,4-difranciocyclohexane,
1,4-dicesiobenzene,
1,5-dilithionaphthalene,
1,2-dilithio-1,2-diphenylethane,
1,5-disodioanthracene,
1,2-dipotassio-1,8-diphenyloctane,
1,3,5-trilithiopentane,
1,5,10-trifranciodecane,
1,5,15-tricesioeicosane,
1,3,5-trisodiocyclohexane,
1,2,5-tripotassionaphthalene,
1,3,5-trilithioanthracene,
1,3,5,8-tetralithiodecane,
1,5,10,20-tetrasodioeicosane,
1,2,4,6-tetrapotassiocyclohexane,
1,2,3,5-tetracesio-4-hexylanthracene,
and the like.

Representative examples of 1-acetylenes having the formula R'C≡CH that can be employed according to the invention include acetylene,
propyne,
butyne-1,
3-methylbutyne-1,
3-methylpentyne-1,
3-ethylpentyne-1,
3-propyl-6-methylheptyne-1,
3-dodecylpentadecyne-1,
6-ethyl-6-propylnonyne-1,
8-methyl-6-butyldecyne-1,
3-cyclopentylpropyne,
3,3-dicyclohexylpropyne,
3,3-diphenylpropyne,
3-(2-naphthyl)propyne,
3-(benzyl)-4-phenylbutyne-1,
4-cyclohexylbutyne-1,
3-(3-methylcyclopentyl)-butyne-1,
3,3-bis(p-tolyl)propyne,
3-(4-methylnaphthyl)propyne,
3-(4-cyclohexylphenyl)-butyne-1,
3-(3-phenylcyclohexyl)propyne,
and the like.

Illustrative examples of the reactions of the alkali metal hydrocarbons with the 1-acetylenes according to the invention are:

(1)  HC≡CH+2n—C$_4$H$_9$Li=LiC≡CLi+2n—C$_4$H$_{10}$
(2)  CH$_3$C≡CH+2n—C$_4$H$_9$Li
    =CH$_2$LiC≡CLi+2n—C$_4$H$_{10}$
(3)  CH$_3$C≡CH+3n—C$_4$H$_9$Li
    =CHLi$_2$C≡CLi+3n—C$_4$H$_{10}$
(4)  CH$_3$C≡CH+4n—C$_4$H$_9$Li=CLi$_3$C≡CLi+4n—C$_4$H$_{10}$

As indicated above, the reactions can be made to proceed predominantly step-wise by proper choice of operating conditions, such as mol ratio of reactants, temperature, time, organoalkali metal compound used, and related process variables. For example, in the above tabulated reactions, the reactions can be controlled to favor substitution of 1, 2, 3 or 4 alkali metal atoms, for example lithium, per molecule of 1-acetylene.

The ratio of reactants, expressed as gram atoms of alkali metal M per mole of R'C≡CH compound, employed in the above process reactions is in the range of 2:1 to 10:1, preferably in the range of 2:1 to 6:1 on the same basis, and is one of the principal variables used to control the number of substituent alkali metal atoms. The reaction time employed generally is in the range of 1 second to 10 days, preferably in the range of 1 minute to 4 days, and is another of the reaction variables used to control the number of substituent alkali metal atoms. The reaction temperature employed is generally in the range —75 to 150° C., preferably in the range 0 to 100° C., and is a further process variable used to control the number of substituent alkali metal atoms. The reaction pressure need be only that required to maintain the reactants substantially in liquid phase, for example, pressures from atmospheric to 500 p.s.i.g., or more.

The above-described reactions of the invention, namely the reaction of an organoalkali metal compound with the defined 1-acetylenes, can be carried out in the presence of an inert reaction diluent comprising a hydrocarbon such as aromatic hydrocarbons, paraffins, and cycloparaffins and/or an inert organic polar compound. Representative examples of suitable hydrocarbon reaction diluents that can be employed include benzene, toluene, cyclohexane, methylcyclohexane, xylene, n-butane, n-hexane, isooctane, decane, dodecane, and the like. Preferred hydrocarbons are those containing from about 4 to about 12 carbon atoms per molecule. Examples of suitable inert organic polar compounds that can be employed as the reaction diluent are ethers, thioethers and tertiary amines such as diethyl ether, ethyl propyl ether, dibenzyl ether, tetrahydrofuran, dioxane, diethyl sulfide, tri-n-propylamine, N,N-dimethylaniline, and the like. It is within the scope of the invention to utilize the above reaction diluents singly or in combination with each other, for example, mixtures of different hydrocarbons as well as mixtures of hydrocarbons with the defined polar compounds.

It has been further found according to the invention that the above defined metalated acetylene reaction products can be quantitatively deuterated by reaction with deuterium oxide or can be used for other reactions involving replacement of the alkali metal atoms with other monovalent radicals such as —CH$_3$, —C$_2$H$_5$, —COOH, and the like. The polymetalated 1-acetylene products of the invention can be identified by reaction with deuterium oxide, which results in quantitative deuteration. For example, the following reactions occur between the products of reactions 2, 3 and 4 above and deuterium oxide:

(2a)  CH$_2$LiC≡CLi+2D$_2$O=CH$_2$DC≡CD+2LiOD (3a)  CHLi$_2$C≡CLi+3D$_2$O=CHD$_2$C≡CD+3LiOD (4a)  CLi$_3$C≡CLi+4D$_2$O=CD$_3$C≡CD+4LiOD

The above reactions, and similar reaction with other alkali metal-substituted acetylenes, serve as a new general method for preparing mono- or polydeuterated acetylenes. These deuterated acetylenes can be used as reference compounds or as starting materials for the synthesis of other deuterium-containing compounds.

The polymetalated 1-acetylene products of the invention can also be used in synthesis reactions for the preparation of other useful and desirable compounds. Three non-limiting examples of the use of the alkali metal substituted acetylenes of the invention in synthesis reactions are:

(5)  CH$_3$CH$_2$C≡CLi+CH$_3$I=CH$_3$CH$_2$C≡CCH$_3$+LiI (6)  CH$_2$LiC≡CLi+CH(C$_2$H$_5$)$_2$SO$_4$
    =CH$_3$CH$_2$CH$_2$C≡CCH$_2$CH$_3$+Li$_2$SO$_4$ (7)
C$_6$H$_5$CHLiC≡CLi + 2CO$_2$ + H$_2$SO$_4$=C$_6$H$_5$CHC≡CCOOH + Li$_2$SO
                                                    |
                                                   COOH

The polymetalated 1-acetylene products obtained in the above reactions according to the invention can be separated and recovered from the reaction mixture or effluent by conventional separation means such as filtration, centrifugation and the like.

Further, according to the invention, novel polymerization initiator compositions are provided comprising the reaction mixture formed by admixing (a) an alkali metal hydrocarbon compound having the formula RM$_x$, as defined previously, with (b) a 1-acetylene compound having the formula R'C≡CH, as defined previously, in an inert reaction diluent in a mol ratio of (a) to (b) ranging from 2:1 to 10:1.

Still further according to the invention a new process is provided for preparing polymers of polymerizable unsaturated monomer compounds. Also, according to the invention a process is provided for polymerizing monomers preferably containing an active $CH_2=C<$ group which comprises contacting a vinylidene containing monomer with a catalyst or initiator composition formed by admixing (a) an alkali metal hydrocarbon compound with (b) a 1-acetylene compound as defined above, said contacting being effected in an inert liquid reaction medium containing 0.1 to 100 millimoles of said initiator composition per hundred grams of monomer at a temperature ranging from $-100$ to $150°$ C. under sufficient reaction pressure to maintain liquid phase conditions.

The invention is applicable to the polymerization, including homopolymerization and copolymerization, of one or more polymerizable unsaturated monomeric compounds containing an active $CH_2=C<$ group. The invention is particularly adapted for the preparation of homopolymers and copolymers of conjugated dienes containing from 4 to 12 carbon atoms per molecule, preferably 4 to 8 carbon atoms per molecule, and vinyl monomers such as vinyl esters, vinyl nitriles, vinyl-substituted heterocyclic compounds, vinyl-substituted aromatic compounds, and the like.

Representative examples of suitable conjugated dienes that can be employed include 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2 - ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3 - di-n-propyl-1,3-butadiene, 2-methyl-3-isopropyl-1,3-butadiene, and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene.

Representative examples of other compounds containing an active $CH_2=C<$ group which can be polymerized according to the invention include styrene, divinylbenzene, 3-vinyltoluene, 1-vinylnaphthalene, 2-vinylnaphthalene, 3-methylstyrene, acrylonitrile, methacrylonitrile, methyl acrylate, methyl methacrylate, 2-methyl-5-vinylpyridine, 2-vinylpyridine, 4-vinylpyridine, and the like.

Other unsaturated vinylidene-containing compounds that can be polymerized according to the invention include the aliphatic 1-olefins having up to and including 8 carbon atoms per molecule such as ethylene, propylene, 1-butene, 1-hexene, 1-octene and the like. Branched chain olefins such as isobutylene can be used as well as 1,1-dialkyl substituted and 1,2-dialkyl substituted olefins such as butene-2, pentene-2, hexene-2, heptene-2, 2-methylbutene-1, 2-methylhexene-1, 2-methylheptene-1 and the like. Other olefins which can be used include di- and polyolefins such as 1,5-hexadiene, 1,4-pentadiene, and 1,4,7-octatriene and cyclic olefins such as cyclohexene. Also mixtures of 2 or more of any of the polymerizable monomers can be employed.

As indicated previously any of the above described monomers can be polymerized alone to form homopolymers or any of the monomers can be copolymerized to random or block copolymers with another of the above-defined monomers. Block copolymers can be prepared, for example, from two or more conjugated dienes by charging one compound initially, allowing it to polymerize and then adding a second conjugated diene and allowing it to polymerize. Likewise, block or random copolymers of conjugated dienes and vinyl-substituted aromatic compounds can be formed. The presence of a small amount of polar compound usually encourages random copolymerization between conjugated dienes and vinyl substituted aromatic compounds. Further, block copolymers can also be prepared from conjugated dienes and polar monomers which are introduced after the conjugated diene has polymerized. These polar monomers include vinylpyridines and vinylquinolines, for example, 2-vinylpyridine, 4-vinylpyridine, 3-methyl-4-vinylquinoline and the like. Also block copolymers can be formed between the vinyl-substituted aromatic compounds and polar monomers.

The temperature employed for polymerization according to the invention is generally in the range from $-100$ to $150°$ C., preferably from $-50$ to $100°$ C. The particular temperature employed depends on both the monomer and initiators used in the polymerization. The pressure employed during polymerization need be only that necessary to maintain the material substantially completely in the liquid phase. The amount of catalyst or initiator used during polymerization will vary appreciably since it is a function of the reaction time and temperature, the monomer or monomers used, and the particular alkali metal-substituted acetylenic compound used as catalyst or initiator. However, the amount employed generally will be in the range of 0.1 to 100 millimoles per 100 grams of monomer with the preferred range being from 1 to 50 millimoles per 100 grams of monomer. The polymerization time employed will ordinarily be in the range of 1 second to 10 days, preferably in the range of 1 minute to 3 days, depending on the interrelated factors of polymerization catalyst, polymerization conditions and the type of reactor employed.

The polymerization according to the invention is preferably carried out in a suitable reaction diluent such as benzene, toluene, cyclohexane, methylcyclohexane, xylene, n-butane, n-hexane, n-pentane, n-heptane, isooctane and the like. Generally the diluent is selected from hydrocarbons, for example, paraffins, cycloparaffins and aromatic hydrocarbons containing 4 to 12 inclusive, carbon atoms per molecule. It is also within the scope of the invention to employ polar compounds that do not deactivate the catalyst or initiator as the reaction diluent for polymerization. Examples of suitable polar compounds include ethers, thioethers and tertiary amines such as diethyl ether, ethyl propyl ether, dibenzyl ether, tetrahydrofuran, dioxane, diethyl sulfide, tri-n-propylamine, N,N-dimethylaniline, and the like. Moreover, if desired, mixtures of two or more of the above defined diluents can be employed as the reaction diluent.

Numerous variations in operative procedure for carrying out the reactions of the invention can be employed. The processes defined according to the invention can be carried out in a batch, semi-continuous, or a continuous manner depending upon the equipment available and the desired operative procedure for carrying out the reactions. For example, the polymerization process of the invention can be carried out as a batch process by charging monomer or monomers into a reactor containing initiator and diluent. If desired, the alkali metal-substituted 1-acetylene initiator dispersed in an inert liquid diluent can be first charged to a suitable polymerization reactor, which can contain the polymerization diluent, and then the monomer can be charged to the reactor. The diluent used for polymerization can be charged along with initiator or monomer or both. In most cases the polymerization is preferably carried out in an inert atmosphere such as nitrogen, helium, argon and the like.

The polymers prepared according to the invention can range from liquids to solid rubbery materials. As a result of using the catalyst or initiators of the invention in polymerization reactions, one end of the polymer chains contains an alkali metal acetylide group that can be used for further reactions. The unquenched polymer solutions can be treated with various reagents to introduce functional groups replacing the terminal lithium atoms on the polymer molecule resulting from the polymerization itself. For example, polymer in solution can be contacted with carbon dioxide to replace the lithium atoms with —COOH groups. Other functional groups which can be introduced include —SH, —OH, halogen and the like. Alternatively, the unquenched polymer solutions can be treated with an alcohol or other reagent to inactivate the catalyst or initiator and/or precipitate polymer which is recovered without functional groups.

As indicated above, the polymer products can range from liquids to rubbery materials and the liquid polymers can subsequently be cured to form solids if desired. The polymers can be compounded by the various methods such as have been used in the past for compounding natural and synthetic rubbers using, for example, a roll mill or a Banbury mixer. Reinforcing agents such as carbon black and mineral fillers, plasticizers, vulcanizing agents, vulcanization accelerators, antioxidants and the like such as have been employed in natural and synthetic rubbers as well as polyolefins can be used when compounding the polymers of the invention. The polymers of the invention can be blended with other polymers such as natural rubber, other synthetic rubbers, polyolefins such as polyethylene and the like. The polymeric products of the invention are useful as adhesives, potting compounds, sealants, tread stocks and for making many types of molded objects.

A better understanding of the invention can be obtained by referring to the following illustrative examples which are not intended, however, to be unduly limitative of the invention.

*Example I*

A run was made in which 15 millimols of n-butyllithium was reacted with 5 millimols of acetylene in 50 milliliters of cyclohexane solvent at 50° C. for 20 hours. A white precipitate was formed (reaction 1). The reaction mixture was short-stopped with 30 millimols of deuterium oxide (reaction 2). Mass spectrograph analyses showed that the product was about 95 percent dideuteroacetylene and 5 percent monodeuteroacetylene, and indicated that the principal product of reaction 1 was lithium carbide.

$$2n\text{-}C_4H_9Li + HC\equiv CH = LiC\equiv CLi + 2n\text{-}C_4H_{10} \quad (1)$$
$$n\text{-}C_4H_9Li + HC\equiv CH = HC\equiv CLi + n\text{-}C_4H_{10}$$
$$LiC\equiv CLi + 2D_2O = DC\equiv CD + 2LiOD \quad (2)$$
$$LiC\equiv CH + D_2O = DC\equiv CH + LiOD$$

*Example II*

Runs were made in which 12.5 millimols of propyne was reacted with n-butyllithium at several mol ratios in 50 milliliters of cyclohexane solvent at 50° C. After 6-hour reaction periods the reaction mixtures were short-stopped with deuterium oxide (about 150 mol percent of the n-butyllithium), and the products were analyzed by mass spectrometry:

| Run No. | Mol Ratio, n-C₄H₉Li/ CH₃C≡CH | Reaction Mixture | | Mol Percent [2] | | | |
|---|---|---|---|---|---|---|---|
| | | Solution | Precipitate | $C_3H_3D$ | $C_3H_2D_2$ | $C_3HD_3$ | $C_3D_4$ |
| 1 | 1/1 | CC [1] | White | 85 | 9 | 5 | 0.5 |
| 2 | 2/1 | CC | Lt. yellow | 22 | 42 | 22 | 14 |
| 3 | 3/1 | CC | Orange | 7 | 22 | 31 | 40 |
| 4 | 4/1 | CC | Dark Orange | 0 | 5 | 15 | 80 |
| 5 | 5/1 | Red | Trace (orange) | 0 | 0 | 10 | 90 |

[1] Clear and colorless.
[2] After addition of excess deuterium oxide.

These data show that the reaction of propyne with n-butyllithium is essentially stepwise, depending on the mol ratio of the reactants, and forms products in the following order: $CH_3C\equiv CLi$, $CH_2LiC\equiv CLi$, $CHLi_2C\equiv CLi$, $CLi_3C\equiv CLi$.

*Example III*

A run was made in which 60 millimols n-butyllithium was added incrementally to 10 millimols of propyne in 50 milliliters of cyclohexane solvent at 50° C.

| Millimols of nC₄H₉Li Added | Reaction Time after nC₄H₉Li Addition | Observation of Reaction Mixture after Indicated Reaction Time |
|---|---|---|
| 10 | Instantaneous | White precipitate. |
| 10 | do | Yellow precipitate. |
| 10 | 3 hr | Do. |
| 10 | 3 hr | Do. |
| 20 | 16 hr | Orange precipitate.[1] |

[1] The reaction mixture was short-stopped with excess deuterium oxide at this point. Mass spectrometry analyses of the resulting deuterated product showed 90 mol percent $CD_3C\equiv CD$ and 10 mol percent $CHD_2C\equiv CD$.

These data again demonstrate the stepwise nature of the reaction of propyne with n-butyllithium, and show that the final product is principally $CLi_3\equiv CLi$.

*Example IV*

A run was made in which 40 millimols of n-butyllithium was reacted with 10 millimols of propyne in 50 milliliters of cyclohexane solvent at 50° C. At the end of the indicated reaction period a sample was removed from the reaction mixture, short-stopped with excess deuterium oxide, and the product was analyzed by mass spectrometry:

| Reaction Time, Min. | Mol Percent | | | |
|---|---|---|---|---|
| | $C_3H_3D$ | $C_3H_2D_2$ | $C_3HD_3$ | $C_3D_4$ |
| 2 | 27 | 39 | 21 | 13 |
| 3 | 26 | 35 | 21 | 18 |
| 5 | 23 | 28 | 22 | 27 |
| 10 | 17 | 15 | 22 | 46 |
| 20 | 10 | 10 | 25 | 55 |
| 30 | 8 | 7 | 23 | 62 |
| 60 | 0 | 0 | 25 | 75 |
| 90 | 0 | 0 | 25 | 75 |
| 180 | 0 | 0 | 20 | 80 |

These data further demonstrate the stepwise nature of the reaction of propyne with n-butyllithium, and show that a reaction period of 1 to 3 hours is required at the reaction conditions used to form principally $CLi_3\equiv CLi$.

*Example V*

A run was made in which 40 millimols of phenylsodium was reacted with 10 millimols of propyne in 100 milliliters of cyclohexane solvent at 50° C. for 20 hours. The reaction mixture was short-stopped with excess deuterium oxide and the product was analyzed by mass spectrometry:

Compound:                                 Mol percent
$CH_3C\equiv CD$ _____ 44
$CH_2DC\equiv CD$ _____ 40
$CHD_2C\equiv CD$ _____ 13
$CD_3C\equiv CD$ _____ 3

These data show that the same type of reaction is obtained with phenyl sodium and propyne as is obtained with n-butyllithium and propyne, but that an appreciably longer reaction time is required for formation of any appreciable amount of the completely substituted product.

Example VI

Runs were made in which 10 millimols of butyne-1 was reacted with n-butyllithium at several mol ratios in 50 milliliters of cyclohexane solvent at 50° C. After 6-hour reaction periods the reaction mixtures were short-stopped with excess deuterium oxide, and the products were analyzed by mass spectrometry:

| Mol Ratio, n-$C_4H_9Li$/ $C_2H_5C{\equiv}CH$ | Reaction Mixture | | Semi-quantitative Analysis | | |
|---|---|---|---|---|---|
| | Solution | Precipitate | $C_4H_5D$ | $C_4H_4D_2$ | $C_4H_3D_3$ |
| 1/1 | CC[1] | White | Major | Trace | Trace. |
| 2/1 | CC | Yellow | | Major | |
| 3/1 | CC | Orange | | | Major. |
| 6/1 | Red | None | | | Do. |

[1] Clear and colorless.

The absence of $C_4H_2D_4(CH_2DCD_2C{\equiv}CD)$, $$C_4HD_5(CHD_2CD_2C{\equiv}CD)$$

and $C_4D_6(CD_3CD_2C{\equiv}CD)$ indicates that alkali metal substitution occurs only on the terminal acetylenic carbon atom and the carbon atom adjacent to the acetylenic linkage. These data also show that the reaction of butyne-1 with n-butyllithium is essentially stepwise, depending on the mol ratio of the reactants, and forms products in the following order: $CH_3CH_2C{\equiv}CLi$, $CH_3CHLiC{\equiv}CLi$, $CH_3CLi_2C{\equiv}CLi$.

Example VII

A run was made in which 1 millimol of butyne-1 was reacted with 6 millimols of n-butyllithium in 12 milliliters of cyclohexane solvent at 96° C. After a 6-hour reaction period the reaction mixture was short-stopped with 12 millimols of deuterium oxide, and the product was analyzed by mass spectrometry. The major product was $CH_3CD_2C{\equiv}CD$.

Example VIII

An alkali metal-substituted acetylenic compound used as polymerization catalyst was prepared by reacting butyllithium and propyne (mol ratio 4/1) in cyclohexane solvent for 6 hours at 50° C. A reddish-orange precipitate was formed; it was separated by ultracentrifuging and was dispersed in dry cyclohexane for use. A portion of this precipitate was deuterated by reaction with deuterium oxide at room temperature, and the reaction product was analyzed by mass spectrometry. The analysis showed about 90 percent $C_3D_4$ and 10 percent $C_3HD_3$, and indicated that the precipitate used as catalyst contained about 90 percent $CLi_3C{\equiv}CLi$ and 10 percent $$CHLi_2C{\equiv}CLi$$

Twenty millimols of butadiene was contacted with 10 millimols of catalyst in a mixed solvent consisting of 50 milliliters of cyclohexane and 20 milliliters of tetrahydrofuran for 20 minutes at 50° C. The reaction was short-stopped by addition of excess deuterium oxide, and the low molecular weight polymer obtained was dried in a vacuum oven and analyzed by infrared, which showed the presence of $-C{\equiv}CD$ groups. This indicates that one end of the polymer chains contained lithium acetylide groups that can be used for further reactions.

Example IX

Styrene was polymerized with 50 millimols per 100 parts by weight of styrene of the catalyst of Example VIII, using the following recipe and conditions:

| | |
|---|---|
| Styrene parts by weight | 100 |
| Cyclohexane do | 780 |
| Tetrahydrofuran do | 100 |
| Temperature, ° C. | 50 |
| Time, min. | 50 |

At the end of the polymerization period, the reaction mixture was short-stopped with water. Infrared analysis of the low molecular weight polystyrene obtained showed the presence of $-C{\equiv}CH$ groups. This indicates that one end of the polymer chains contained lithium acetylide groups that can be used for further reactions.

Example X

Butadiene was polymerized with the catalyst of Example VIII, using the following recipe and conditions:

| | |
|---|---|
| Butadiene parts by weight | 100 |
| Toluene do | 1000 |
| Temperature, ° C. | 50 |
| Time, hr. | 6 |

Conversion was 100 percent in all runs, and there was no gel (b); other results are:

| Run No. | Catalyst Conc., mhm[2] | Polymer Viscosity[1] | |
|---|---|---|---|
| | | Inherent (a) | Mooney, Ml–4 (c) |
| 1 | 2 | 3.08 | 117 |
| 2 | 2.5 | 2.21 | 39 |
| 3 | 3 | 1.97 | 25 |

[1] Reaction short-stopped and polymer coagulated with isopropanol; one-half part by weight of 2,2'-methylene-bis-(4-methyl-6-tert-butyl-phenol) was added per 100 parts of polymer.
[2] Millimols per hundred millimols monomer.
NOTE.—See below for explanation of (a) and (c).

Example XI

Butadiene was polymerized with the catalyst of Example VIII, using the recipe and conditions of Example X except that reaction time was 3 hours. Conversion was 100 percent in all runs and there was no gel; other results are:

| Run No. | Catalyst Concn., mhm | Shortstopped | Polymer Viscosity[1] | | Cold Flow (d) mg./min. |
|---|---|---|---|---|---|
| | | | Inherent (a) | Mooney, Ml–4 (c) | |
| 1 | 3 | Isopropanol | 1.20 | 2 | >200 |
| 2 | 3 | Oxygen[2] | 1.43 | 10 | 48 |
| 3 | 2.5 | Isopropanol | 3.21 | 123 | 4.2 |
| 4 | 2.5 | Oxygen[2] | 3.81 | 150 | 0 |

[1] Polymers coagulated with isopropanol; one-half part by weight of 2,2'-methylene-bis-(4-methyl-6-tertbutylphenol) was added per 100 parts of polymer.
[2] Polymers from Runs 2 and 4 were dark brown.
NOTE.—See below for explanation of (a), (c), and (d).

In the preceding specific examples inherent viscosity, percentage gel, Mooney viscosity and cold flow were determined by the following procedures:

(a) One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

(b) Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

(c) ASTM D-1646-61.

(d) Cold flow was determined by the following procedure. Cold flow is measured by extruding the rubber through a ¼-inch orifice at 3.5 p.s.i. pressure and a temperature of 50° C. (122° F.). After allowing 10 minutes to reach steady state, the rate of extrusion is measured and reported in milligrams per minute.

It will be evident to those skilled in the art that many variations and modifications can be practiced upon consideration of the foregoing disclosure. Such variations and modifications are believed to be within the spirit and scope of the present invention.

We claim:

1. A process for the production of polymetalated 1-acetylenes wherein the metal substituents replace acetylenic hydrogen atoms and hydrogen atoms attached to the carbon atom alpha to the acetylenic linkage which comprises contacting (a) a compound of the formula $RM_x$ wherein R is a hydrocarbon radical selected from the group consisting of saturated aliphatic, saturated cycloaliphatic and aromatic radicals, $x$ is an integer from 1 to 4, inclusive, and M is an alkali metal with (b) a 1-acetylene compound of the formula $R'C\equiv CH$, wherein $R'$ is $R''_2CH-$ radicals and wherein each $R''$ is selected from the group consisting of hydrogen and hydrocarbon radicals selected from saturated aliphatic, saturated cycloaliphatic, and aromatic radicals containing up to and including 12 carbon atoms, said contacting being effected in an inert liquid reaction medium at a temperature ranging from $-75$ to $150°$ C. under sufficient pressure to maintain liquid phase conditions with a mol ratio of (a) to (b) ranging from 2:1 to 10:1, and recovering the polymetalated acetylene thus formed as product.

2. A process according to claim 1 wherein (a) is n-butyllithium and (b) is propyne and the ratio of (a) to (b) is in the range 2:1 to 6:1.

3. A process according to claim 1 wherein (a) is n-butyllithium and (b) is butyne-1 and the ratio of (a) to (b) is in the range 2:1 to 6:1.

4. A process according to claim 1 wherein (a) is phenylsodium and (b) is propyne and the ratio of (a) to (b) is in the range 2:1 to 6:1.

References Cited by the Examiner

UNITED STATES PATENTS

| | | | |
|---|---|---|---|
| 2,674,621 | 4/1954 | Oroshnik | 260—665 |
| 3,097,193 | 7/1963 | Gruver | 260—94.7 |
| 3,135,716 | 6/1964 | Uraneck et al. | 260—665 |

OTHER REFERENCES

Elsevier's Encyclopedia of Organic Chemistry, vol. 12A, Elsevier Publishing Co., New York, N.Y. (1948), page 387.

Sittig: ACS Monograph Series, No. 133, 1956, page 318.

Sittig: ACS Monograph Series, No. 133, 1956, page 319.

Tadokoro et al.: Bulletin Chemical Society of Japan, vol. 34, October 1961, pages 1504 to 1511, (page 1506 relied on).

HELEN M. McCARTHY, *Acting Primary Examiner.*

TOBIAS E. LEVOW, *Examiner.*

E. C. BARTLETT, T. L. IAPALUCCI,
*Assistant Examiners.*